United States Patent
Sartin et al.

(10) Patent No.: US 8,104,814 B2
(45) Date of Patent: Jan. 31, 2012

(54) EMERGENCY TREATMENT STATION AND STRETCHER SYSTEM

(75) Inventors: Edward Lewis Sartin, Greensboro, NC (US); Edward Austin Sartin, Graham, NC (US)

(73) Assignee: Aces Holdings, LLC, Archdale, NC (US)

( * ) Notice: Subject to any disclaimer, the term of this patent is extended or adjusted under 35 U.S.C. 154(b) by 442 days.

(21) Appl. No.: 12/514,525

(22) PCT Filed: Nov. 6, 2007

(86) PCT No.: PCT/US2007/083757
§ 371 (c)(1),
(2), (4) Date: May 12, 2009

(87) PCT Pub. No.: WO2008/063871
PCT Pub. Date: May 29, 2008

(65) Prior Publication Data
US 2010/0052351 A1    Mar. 4, 2010

Related U.S. Application Data

(60) Provisional application No. 60/858,532, filed on Nov. 13, 2006, provisional application No. 60/899,737, filed on Feb. 6, 2007, provisional application No. 60/936,132, filed on Jun. 18, 2007.

(51) Int. Cl.
*A61G 1/02* (2006.01)
(52) U.S. Cl. ............... 296/24.38; 296/16; 296/19
(58) Field of Classification Search ............ 296/16, 296/18, 24.38, 178
See application file for complete search history.

(56) References Cited

U.S. PATENT DOCUMENTS

| 2,216,243 A | 10/1940 | Kreidler |
| 2,456,024 A * | 12/1948 | Schofield ............. 296/19 |
| 4,006,500 A | 2/1977 | Bonifay |

(Continued)

FOREIGN PATENT DOCUMENTS

WO    WO 2005/120896 A2    12/2005

OTHER PUBLICATIONS

Patent Abstracts of Japan (JP Pub. No. 2002153512A; published: May 28, 2002).

(Continued)

*Primary Examiner* — Jason S Morrow
(74) *Attorney, Agent, or Firm* — Womble Carlyle Sandridge & Rice, LLP

(57) ABSTRACT

The invention relates to a vehicle used in transporting or treating large numbers of victims or patients from a mass-casualty incident to or from a hospital in an evacuation situation. The typical vehicle contains a stacked stretcher system, a loading ramp system, and an oxygen system. This vehicle must have an independent energy source or must be capable of being powered by an outside energy source. The vehicle can be flexible enough to provide facilities for treatment of victims either at the site of a disaster, in route from the disaster, at any remote site, or near a healthcare facility. A variation of the vehicle contains refrigeration or freezer units and is capable of transporting or maintaining casualties until mortuary services can be obtained. Variations of the equipment include trays made of stainless steel, stretchers that can be easily cleaned and that allow for easy drainage of liquids.

24 Claims, 13 Drawing Sheets

U.S. PATENT DOCUMENTS

| | | | |
|---|---|---|---|
| 4,339,146 A | | 7/1982 | Lehmann |
| 4,425,978 A | * | 1/1984 | Star ............................... 180/243 |
| 4,570,733 A | | 2/1986 | Star |
| 4,824,158 A | * | 4/1989 | Peters et al. ................. 296/37.6 |
| 5,178,432 A | | 1/1993 | Zeman |
| 5,372,339 A | | 12/1994 | Morgan |
| 5,383,629 A | | 1/1995 | Morgan |
| 5,490,703 A | | 2/1996 | Hewko |
| 5,497,968 A | | 3/1996 | Hewko |
| 5,509,710 A | | 4/1996 | Eavenson |
| 5,755,478 A | | 5/1998 | Kamiya |
| 5,775,758 A | | 7/1998 | Eberspacher |
| 5,779,296 A | | 7/1998 | Hewko |
| 5,813,629 A | * | 9/1998 | Cabrera ...................... 244/118.6 |
| 6,039,377 A | | 3/2000 | Eberspacher |
| 6,688,664 B2 | | 2/2004 | Sioutis |
| 6,916,056 B2 | * | 7/2005 | Mitchell et al. ................. 296/20 |
| 6,929,061 B2 | | 8/2005 | Lajeunesse |
| 7,095,210 B2 | | 8/2006 | Tamura |
| 7,111,340 B2 | | 9/2006 | Mitchell |
| 7,188,880 B1 | | 3/2007 | Frieder |
| 7,328,926 B1 | * | 2/2008 | Myers et al. ..................... 296/19 |
| 7,883,133 B2 | * | 2/2011 | Chinn ............................. 296/19 |
| 7,931,321 B2 | * | 4/2011 | Kapoor .......................... 296/19 |
| 2003/0102685 A1 | | 6/2003 | Sioutis |
| 2004/0080172 A1 | | 4/2004 | Mitchell |
| 2005/0225107 A1 | | 10/2005 | Mitchell |
| 2006/0137886 A1 | | 6/2006 | Cano |
| 2007/0075557 A1 | | 4/2007 | Frieder |
| 2007/0102946 A1 | | 5/2007 | Blackwell |
| 2008/0004663 A1 | | 1/2008 | Jorgenson |
| 2011/0089124 A1 | * | 4/2011 | Chinn ............................. 211/27 |

OTHER PUBLICATIONS

Abstract (JP Pub. No. 2004 69399A; published: Mar. 4, 2004).
Patent Abstracts of Japan (JP Pub. No. 2007111139A; published: May 10, 2007).
International Search Report and Written Opinion (PCT/US2007/083757; published: May 29, 2008).
"Countering International Terrorisim: the United Kingdom's Strategy," HM Government, pp. 1-38, Jul. 2006 (http://www.cabinetoffice.gov.uk/security_and_intelligence/community.aspx).
"Giant Medgadget: Mercedes Bus-Based Ambulance," medGadget, pp. 1-5, (May 18, 2006) (http://medgadget.com/archives/2006/05/giant medgadget 1.html, as of Sep. 8, 2008).
Response Systems, LLC—Disaster Preparation, web pages pp. 1-4 (Sep. 2, 2009); web pages pp. 1-12 (Apr. 22, 2008).

* cited by examiner

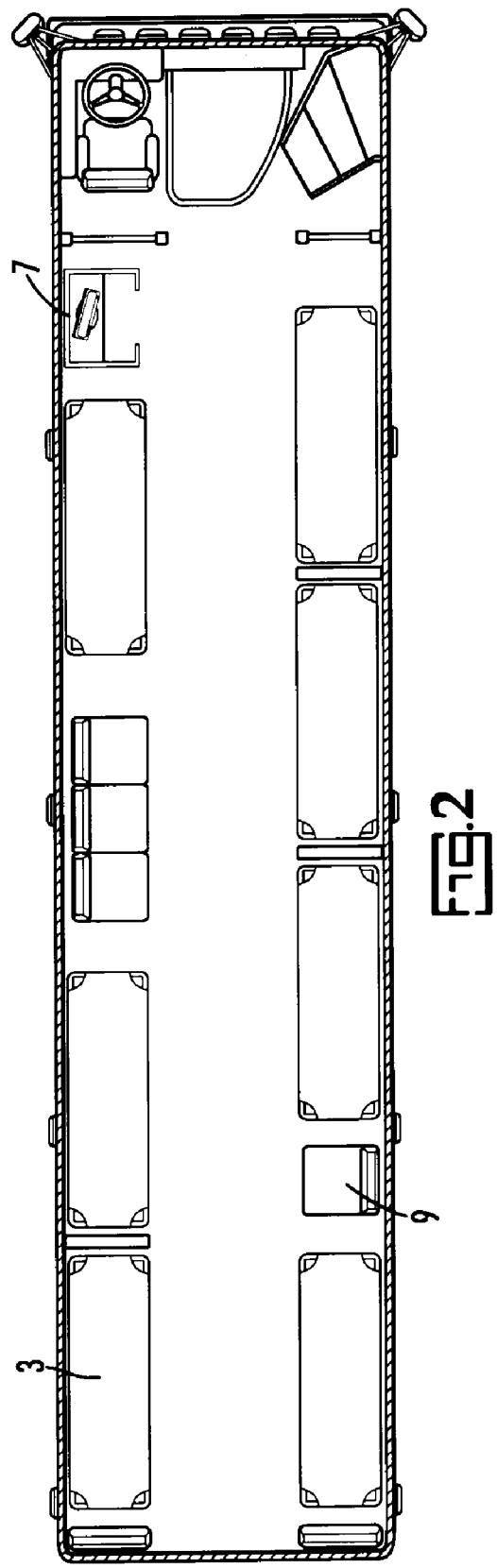

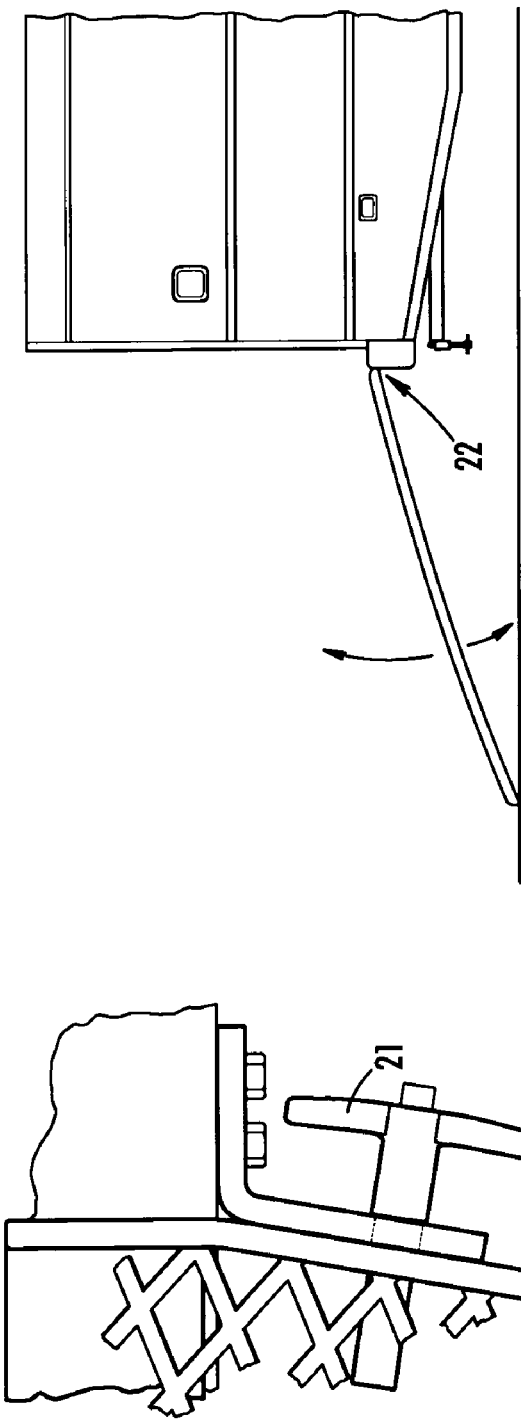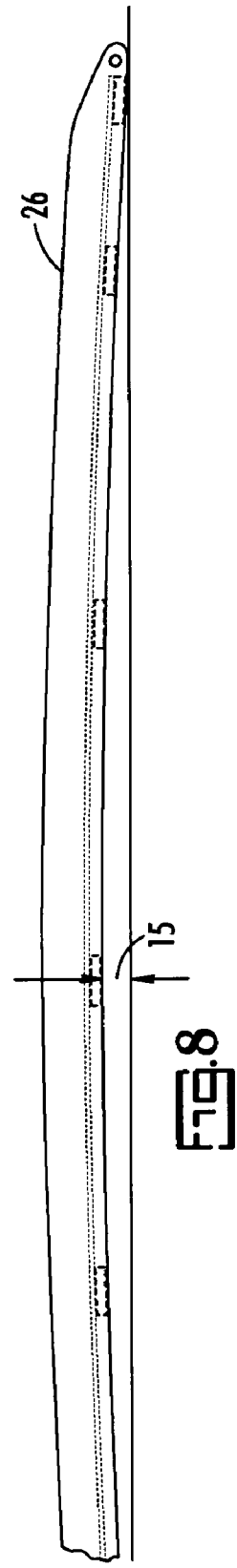

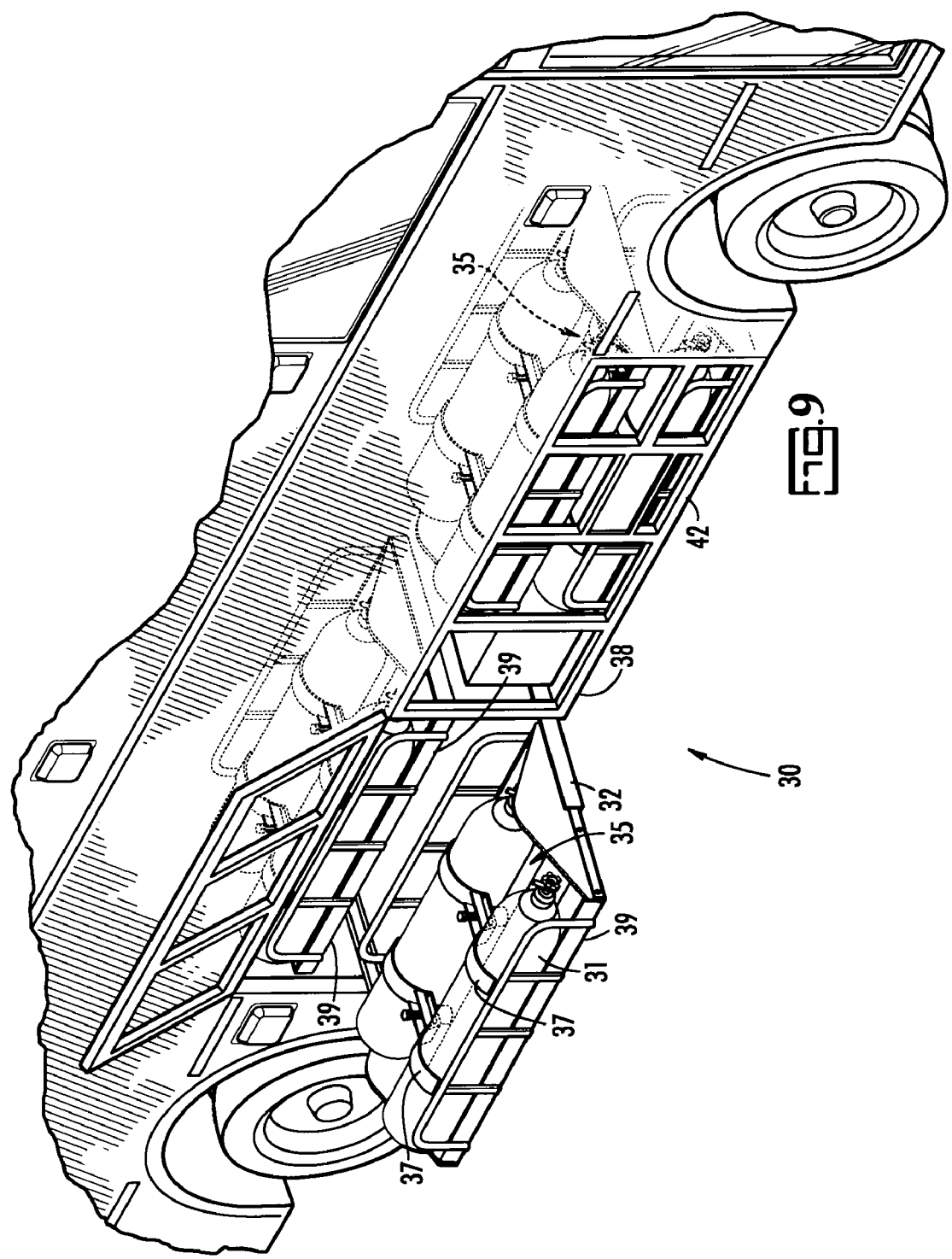

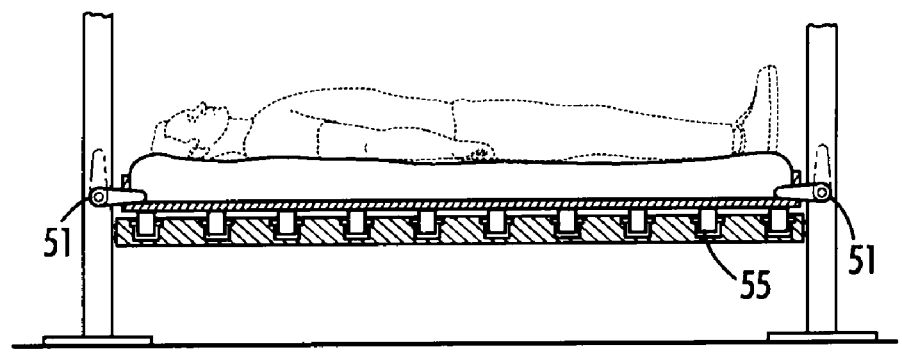
FIG.14A
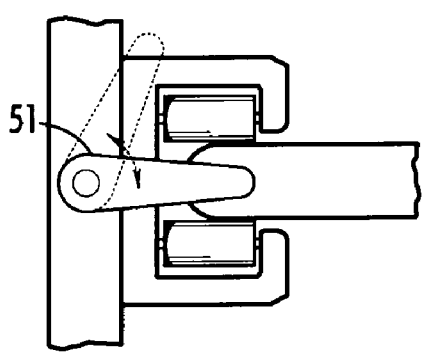 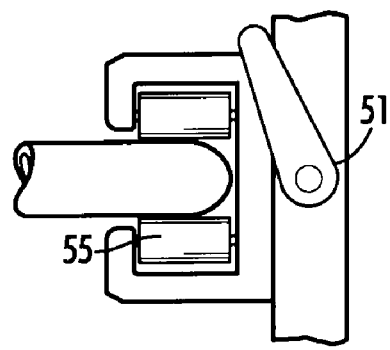
FIG.14B   FIG.14C
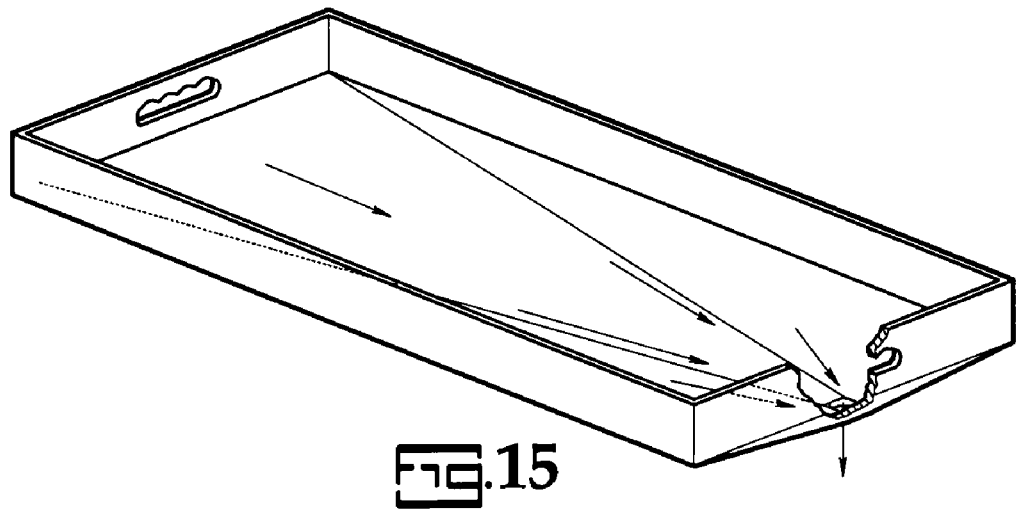
FIG.15

EMERGENCY TREATMENT STATION AND STRETCHER SYSTEM

This is a national stage application from International Application No. PCT/US2007/083757 pursuant to 35 U.SC. §371, filed Nov. 6, 2007, which claims the benefit of priority to U.S. Provisional Patent Applications Ser. No. 60/858,532, filed Nov. 13, 2006, Ser. No. 60/899,737, filed Feb. 6, 2007, and Ser. No. 60/936,132, filed Jun. 18, 2007, all of which are incorporated in their entirety herein.

BACKGROUND

Ambulances are able to carry only a very small number of patients (generally only one or two), making it extremely complex to transport all the victims or patients that have treatment or evacuation needs when a mass casualty event or disaster occurs. Currently, when such an event occurs, many ambulances are called to transport the victims, and, given the limited number of ambulances generally available within a given geographic area, the total number of patients that can be transported is also greatly limited. Furthermore, with so many victims needing transportation from one mass casualty event, if all conventional ambulances are used for transport, people in other coverage areas might suffer because ambulances are not available to handle other emergencies.

A similar problem is encountered when an evacuation of a large number of patients is required. For example, the ability to relocate the patients from a hospital or a nursing home that may be in the path of an approaching hurricane also would be limited by the availability and number of ambulances available.

Similarly, if there is a need to treat a large number of victims at a given location, the only option available now is to transport the victims to a remote site for treatment, and movement of the large number of victims is similarly impacted by the limited number of ambulances. Alternatively, a tent-like treatment facility might be set up, but the suitability of such a system would depend on the disaster conditions (e.g., a tent would not hold up well during windy conditions; climate extremes might be difficult to control; once patients are stabilized in the tent-like structure, they would still need to be transported to a hospital or other facility for extended care).

Other ambulance-type vehicles, such as those used in the military, use J-type hooks or loop-type straps for holding stretchers, and loading a stretcher onto such a J-hook type holder or loop-type straps requires up to six people to maneuver the stretcher into storage position.

Furthermore, if there is a need to transport a large number of casualties, multiple ambulances or hearses would be needed.

SUMMARY OF THE INVENTION

The subject of the invention relates to a vehicle used in transporting or treating large numbers of victims or patients (often 20 or more) from a mass-casualty incident, such as a terrorist attack or a major medical emergency (e.g., a pandemic or major accident), to a hospital or from a hospital in an evacuation situation, such as prior to a natural disaster (e.g., a hurricane). The vehicle can accommodate multiple victims in a series of stacked stretchers. In addition, the stretchers are fixed in position and the victims are securely attached to the stretchers during transport to protect the victims. Furthermore, the victims are easily and quickly loaded onto or off from the stretchers system.

Given the large number of victims carried, the vehicle has a ramp for loading and unloading the victims. In addition, a system for providing oxygen to a large number of patients can be provided.

Furthermore, the vehicle can be flexible enough to provide facilities for treatment of victims either at the site of a disaster, in route from the disaster or at any remote site or near a healthcare facility (e.g., adjacent to a hospital when there are insufficient empty beds in the hospital to accommodate the patients). This means that the vehicle must have an independent energy source or the vehicle must be capable of being powered by an outside energy source.

In addition, a variation of the vehicle is capable of transporting casualties from a disaster or maintaining the casualties until mortuary services can be obtained, and these vehicles contain refrigeration or freezer units.

Given the variety of the above requirements, special variations of equipment may be utilized, such as trays made of stainless steel or other materials, stretchers or similar surfaces that can be easily cleaned or that allow for easy drainage of bodily liquids that might accumulate on the surfaces or easy drainage of cleaning products that might be used to clean the surfaces.

BRIEF DESCRIPTION OF THE FIGURES

FIG. 2 shows a cut-away top view of the emergency response vehicle.

FIG. 5 shows a partial detail of the threshold ramp assembly and the locking pin in its locked position.

FIG. 6A shows the ramp extended from a typical vehicle, showing that the extended ramp can pivot up or down for loading at different heights around its connection point. In addition, the underfloor ramp storage assembly and the ramp locking arm assembly remain attached to the vehicle when the ramp is removed.

FIG. 8 shows the contour of a typical ramp.

FIG. 9 shows the components of the oxygen storage system used in the emergency response vehicle.

FIGS. 14 A, B and C show variations in the roller and locking systems used for loading the stretchers when sliding stretchers are not used.

FIG. 15 shows the stretcher tray assembly, which collects bodily fluids and prevents them from dripping on another patient. The tray assembly has a drain connection which allows for the removal of bodily fluids from a stretcher or cleaning products used to clean the trays.

DETAILED DESCRIPTION OF THE INVENTION

Figure 1:
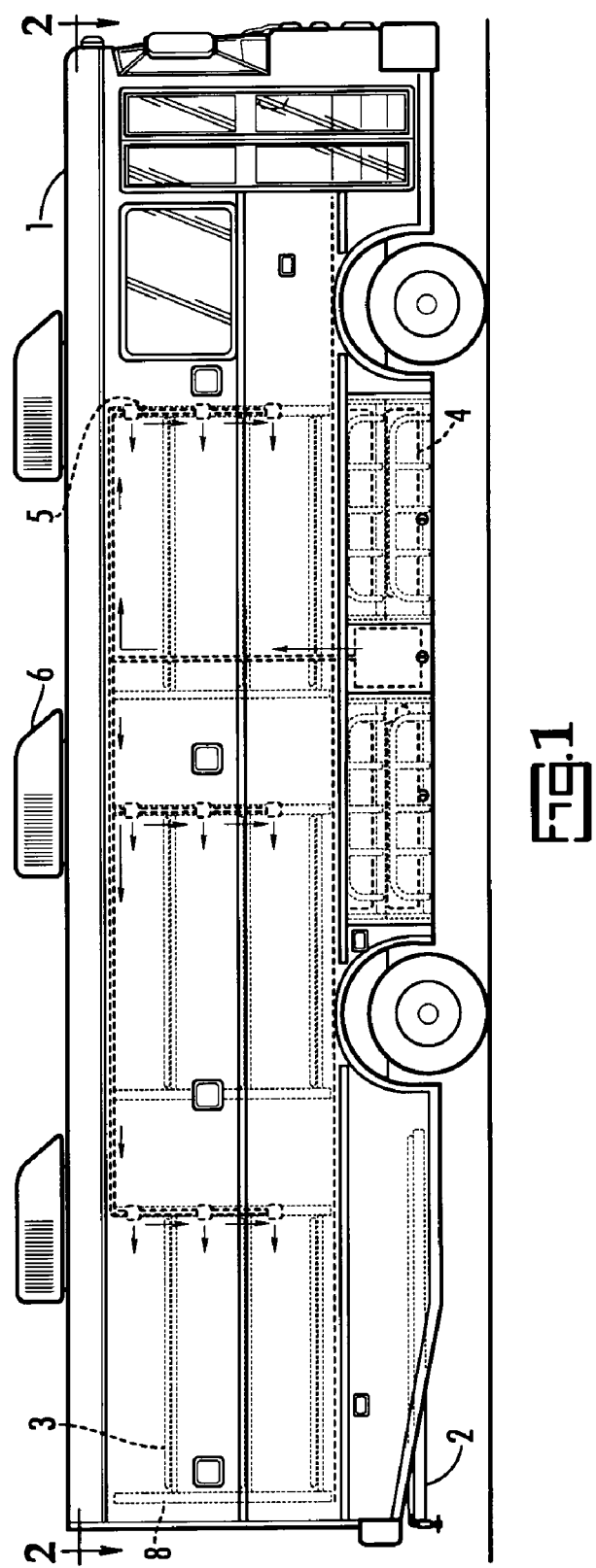
FIG. 1 shows a side view of a typical emergency response vehicle.

The invention relates to a vehicle used in transporting or treating large numbers of victims or patients from a mass-casualty incident. Such a vehicle might be needed to respond to numerous types of emergency events, such as natural disasters (e.g., hurricanes, floods, earthquakes, pandemics), breaches of homeland security (e.g., terrorist attacks), major accidents (e.g., train derailments, airplane accidents, bridge collapse, major highway pile-ups), and military situations (e.g., evacuation of wounded troops to or from a military hospital). In any of these emergency events, it might be necessary, for example, either:

1. to evacuate the victims from the disaster site to a hospital or other treatment facility;
2. to evacuate the patients from one treatment facility to an alternate treatment facility or to a safe area (e.g., to temporarily move patients from a hospital or nursing home that is in the path of a hurricane);
3. to set up a temporary treatment facility in a remote location;
4. to treat large numbers of patients in the vehicle when alternate treatment facilities are unavailable because of distance or over-crowding at remote treatment facilities;
5. to move the equipment in an emergency response vehicle to an existing building where treatment can be provided (e.g., establish a temporary treatment facility in a school during a natural disaster); or
6. to maintain casualties until they can be handled by a mortuary facility.

The use of the term "victim" in this disclosure should be interpreted broadly and is intended to refer, for example, to a patient who has been injured and is in need of treatment; an incapacitated patient who is undergoing treatment, care or observation at an existing hospital or other treatment facility (e.g., a nursing home); a casualty of the emergency event; or other such circumstances.

The emergency response vehicle can be a vehicle for transport on land, sea, in the air, or in any combination of these environments (e.g., a marine vehicle capable of transport in the water and on land). The land vehicle can take many forms, for example one built in a bus-type vehicle, a truck-type vehicle, a subway car or a train.

The size of the vehicle is also variable, depending on the number of victims anticipated. Given that existing ambulances typically hold only one or at most two patients, the emergency response vehicles described herein might have space for as few as approximately 3 victims and as many as 40 or more.

Given the variety of situations that might be encountered, the vehicles can be designed to have different equipment, but the minimum requirement is that the vehicle have the capability of holding multiple stretchers on stretcher receiving assemblies, generally stacked on sliding assemblies so that two, three or more are above each other. The vehicle will require a means for loading or unloading the victims, typically a ramp. In addition, the vehicle might require an oxygen storage and distribution system for providing an individually metered oxygen supply to each patient.

The vehicle may also require a temperature control system, to provide heat or air conditioning for providing a reasonable environment for the victims. If the vehicle might be used for transporting or storing casualties, the temperature control system might need the capability of providing refrigeration or freezer conditions. A variation for carrying both patients requiring treatment and casualties is also possible, generally in separate compartments having separate temperature adjustments and ventilation systems.

Furthermore, the vehicle should have an independent energy source in, or attached to, the vehicle or should be capable of being powered by an outside energy source. For example, the engine on the vehicle might have the capability of charging batteries contained in the vehicle, with these batteries being able to supply the energy needs for operating the facilities for the victims. In another example, a source of electricity from outside the vehicle might be connected to the vehicle for the purpose of providing energy for operating the facilities for the victims.

Given that there might be bodily fluids that accumulate from the victims, the sliding stretcher tray assembly in which the patient rests could collect and hold those fluids from dripping on a patient in a lower position. The stretcher tray that the victims use would also likely have a drain plug and a connection system for the draining or discharge of those fluids or cleaning agents that the attendants might use. It should be noted that the term "stretcher" as used here is not limited to the typical stretcher, but it also refers to any surface on which the victim is reclining. Thus a stretcher could refer to a cloth or metal surface on which the victim is laying, a plastic-coated reclining surface, a padded surface, a mattress or any other surface that could accommodate a patient or victim.

The types of materials specified in making the components described below are merely examples, and other types of materials, such as stainless steel, aluminum, steel or other manufactured materials can also be used. If reasonable, manufactured goods made from natural products (e.g., wood) can also be used. The dimensions of the components represent an example, and the components can easily be built to larger or smaller sizes depending on the needs of the transporting agency. The components can also be varied in design, so long as adequate strength is maintained.

This application provides additional detail on other variations, such as the stretcher storage assembly and sliding mechanisms, which can be used not only in vehicles but also, particularly on a temporary basis, in buildings, and the refrigeration system that can be utilized in a mortuary version of the vehicle.

FIG. 1 shows the side view of a typical vehicle 1 that has been converted into an evacuation/triage vehicle. FIG. 2 shows the top view of the vehicle (along the cut line shown in FIG. 1). Vehicles of all sizes and dimensions can be used. The length of a vehicle used depends on the number of patients to be transported or cared for and the amount of the bus interior that is converted for medical personnel supplies and equipment. Generally the vehicle contains a ramp 2 for loading and unloading victims, stretchers 3 for holding victims, and an oxygen system, containing oxygen storage components or tanks 4 and an oxygen delivery system for large numbers of patients 5. The vehicle shown also has a heating/air conditioning/refrigeration system 6, a nursing station 7, and an attendant's seat 9. The stretcher system in the evacuation vehicle also includes tray assemblies 8.

Ramp for Loading and Unloading

One problem arises when stretchered patients are loaded or unloaded from a vehicle floor level that is above ground. The loading and unloading of large numbers of patients is hampered by the height of the floor of the vehicle that is transporting the patients. Under current conditions, medical attendants carrying stretchered patients would have to transfer those patients from one attendant to another as they load them from a ground level into the vehicle floor level thereby increasing the likelihood that a patient may be dropped. A height adjustable loading/unloading ramp allows medical attendants to enter or leave the vehicle carrying a stretchered patient up, down or across the ramp without transferring the patient to another attendant, thereby reducing the possibility of dropping the patient.

The adjustable detachable loading/unloading ramp is designed to allow loading/unloading from the ground position up to approximately 15 degrees above the floor level of the vehicle. The ramp can be manufactured from many different component materials and can be built to any size or weight capacity.

Figure 3A:
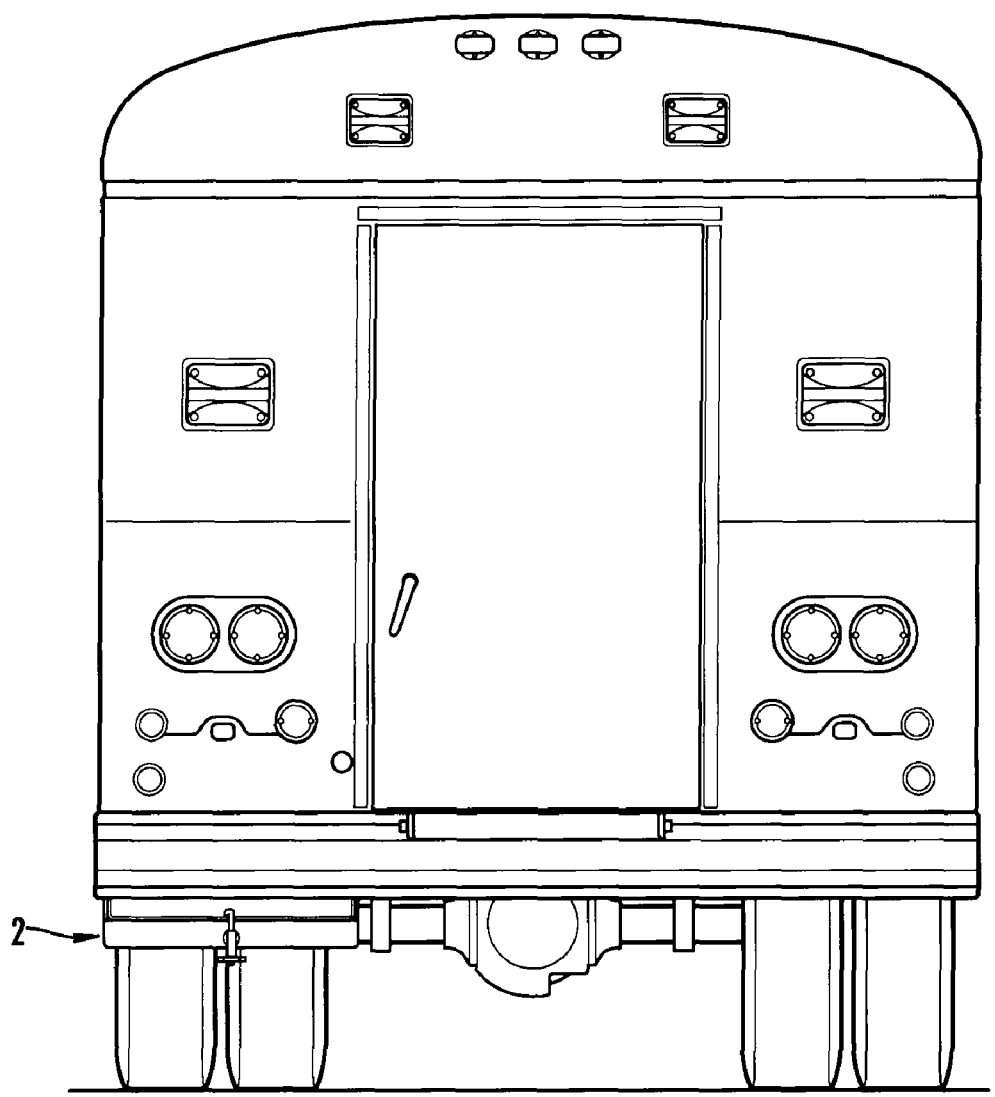
FIGS. 3A and 3B show rear views of the vehicle, with the ramp stored under the vehicle (FIG. 3A) and extended (FIG. 3B).
Figure 3B:
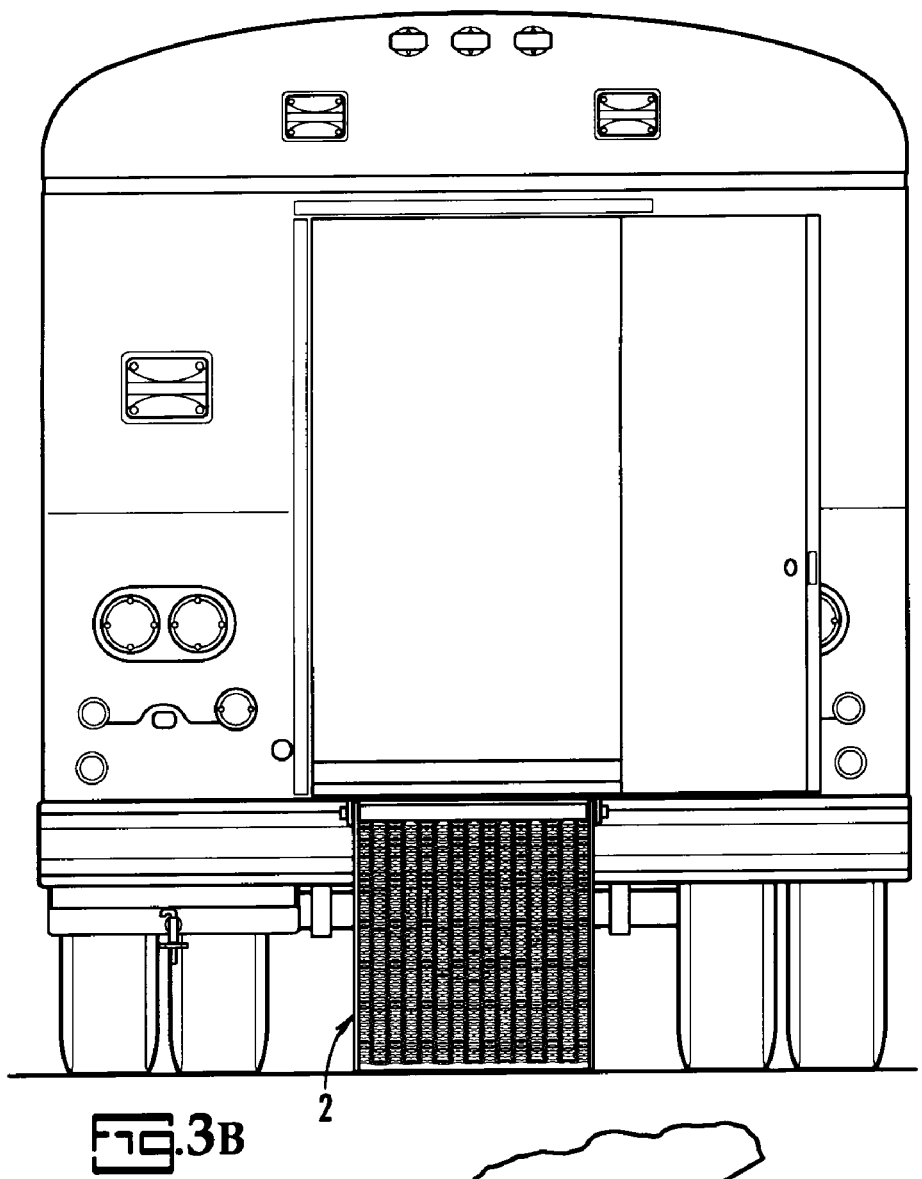

The detachable loading/unloading ramp stores under the vehicle (see FIG. 3A) and when needed is slid out and attached to the bumper or any side of the vehicle (see, for example, FIG. 3B). The vertical adjustment feature of the ramp allows patients to be loaded from the ground area up to the floor level of the vehicle or down to a vehicle which is lower than where the victims are located (i.e the ramp can be used to carry patients "uphill", "downhill" or on a level plane into the vehicle). The adjustable ramp allows the vehicle to park at a hospital loading area or onsite disaster area and, when the ramp is deployed at any angle, patients can be loaded in a very safe and fast manner. In many cases the ramp when in use will be attached to the center of the rear of the vehicle. (See FIG. 3B) However, if, for example, a rear engine vehicle is used, the location of the ramp may need to be changed. Alternatively the ramp could be attached to any side of the vehicle or to one side of the rear, if a narrow vehicle, having stretchers on only one side of the aisle, is used, or to any other reasonable position.

Figure 4:
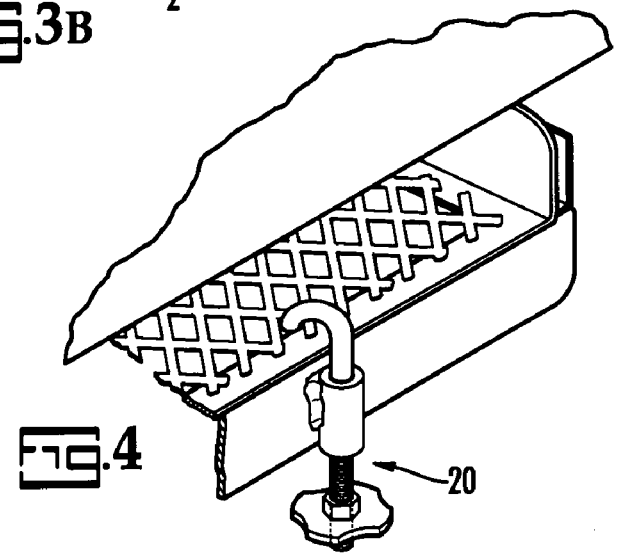
FIG. 4 shows a portion of the stored ramp with a ramp locking arm holding it in place.
Figure 7:
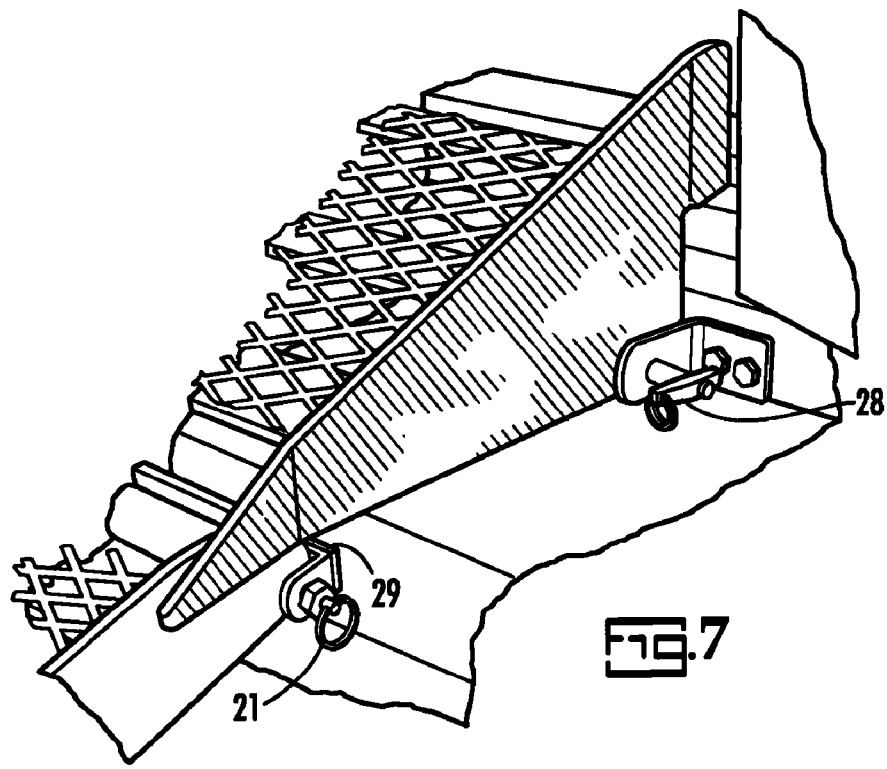
FIG. 7 shows further details of the attached ramp, the ramp threshold assembly and the locking system of each.

An additional aspect of the invention relates to how the ramp is secured to the vehicle. (See FIG. 4.) The ramp storage assembly, which is located under the current vehicle (but could be located anywhere on or in the vehicle) is specifically beneficial to medical personnel because it allows the ramp to be stored out of the way when not in use. When the ramp is needed the ramp locking arm 20 is loosened and the ramp slides out from the storage assembly and is inserted into the ramp tray receiver 29. The locking pins 21 are inserted (see FIGS. 5 and 7), and the ramp is locked in place.

The ramp assembly has an adjustable angle feature 22 that allows the ramp to be positioned on any angle level from a downward angle to an upward angle, and anywhere in between, depending on the situation the agency finds on-site. The vehicle could back up to any hospital loading dock and the ramp could be secured from the vehicle to the top of the dock platform to make loading or unloading of patients easy and safe. The vehicle could go to any on-site scene, and the ramp could be attached and lowered or raised to any ground level.

The ramp assembly can be built to larger or smaller sizes depending on the needs of the agency. The typical ramp exemplified here measures 111" long by 25⅞" wide by 6" tall. The ramp is made out of expanded steel grating 23, 3" tall ¼" flat rolled steel sides 24, 1" by ¼" round frame tubing 25, 2" by ¼" flat bar structural steel framing. All components are hot galvanized dipped to protect from rust. Other finishes and types of materials can be used to build the ramp assembly.

The size of the current ramp storage assembly size (i.e., the area where the ramp is stored when it is not in use) is an example only and the ramp receiver assembly can be built to larger or smaller sizes depending on the actual size of the ramp and the needs of the agency. The dimensions of a typical ramp receiver assembly dimensions are 120" long by 27" wide by 16¾" tall. The ramp receiver is made out of 1" by ¼" 90 degree angle steel, 2" by ¼" 90 degree angle steel, 4" by ¼" flat bar steel. All components are hot galvanized dipped to protect from rust. Other finishes and types of materials can be used to build the ramp storage assembly.

The detachable loading/unloading ramp is specifically designed and manufactured to support a large weight load of 1,000 pounds or more. This weight load has been specifically calculated to include two caregivers carrying a stretchered patient in or out of the vehicle. Curved steel (FIG. 8) is used in the construction of the ramp for added weight capacity. The height of the side of the curved steel 26 used in the ramp structure is typically about 3". A side view of the ramp exemplified in FIG. 8 shows that the curvature 15 over the length of the ramp is 6", which indicates that the storage compartment for the ramp must, in this example, be greater than 6".

The ramp threshold assembly 27 is specifically designed to eliminate any uneven feature of a vehicle which allows an ambulance type of rolling stretcher to roll in or out of the vehicle on a smooth service as well as provide medical personnel a smooth surface to walk on while carrying a patient or victim in or out of a vehicle. The threshold ramp piece is specifically designed and manufactured to flare out to the door opening size of the vehicle and then taper down (or up) to the ramp size as it meets the ramp assembly. The threshold assembly is easily locked into place by a locking pin 28 on each side. The locking pin slides through a permanently mounted bracket and the threshold piece on each side. The threshold piece is easily removed by pulling and removing the locking pins. The threshold piece is then stored in a convenient location on the vehicle. The threshold assembly exemplified herein tapers from 26" wide at the ramp assembly to 36" wide at the door opening. The length of the threshold assembly is 17" and the height is 3". The dimensions are examples only, and the threshold assembly can be manufactured to any size depending on the vehicle being used. All components are hot galvanized dipped to protect from rust. Other finishes and types of materials can easily be used to build the threshold assembly.

Figure 6B:
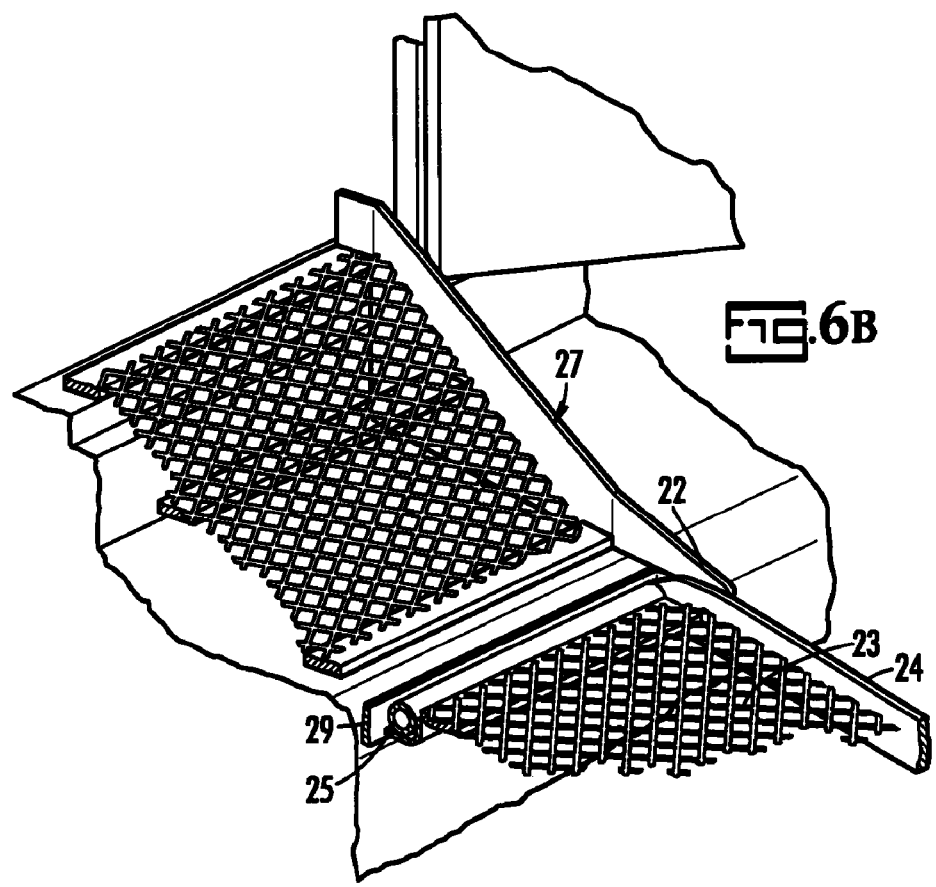
FIG. 6B shows detail of the threshold ramp assembly, the ramp receiver assembly and a portion of the ramp assembly.

The ramp receiver tray assembly 29 (FIGS. 6B and 7), which mounts permanently to the vehicle is generally constructed of ⅜" steel and is power coated and painted. Preferably the receiver tray assembly contains a "U-shaped" or partial "U-shaped" component to receive the round upper end of the ramp. The receiver tray assembly measures 28" wide, 3" tall and 1½" deep. The ramp receiver tray is used to connect the ramp to the vehicle. The ramp is placed into the top of the tray assembly and, when locking pins 21 are pulled on each side, the ramp moves down into the tray and is securely locked into position. The ramp receiver tray is designed and manufactured to allow the ramp assembly to move up and down to different height levels for ease of loading patients or victims. When the ramp is no longer needed to load or unload patients or victims the ramp tray locking pins are pulled on each side and the ramp is lifted out of the tray and then stored under the vehicle. The ramp receiver assembly, like the other components of the ramp assembly, can be built to larger or smaller sizes and other materials can be used for construction (such as stainless steel and other components).

Oxygen System

Ambulances typically only provide a small amount of metered oxygen to treat one or two patients making it impossible to provide an oxygen supply for large numbers of patients on one vehicle or for a long journey. The invention allows individually metered oxygen supplies for large numbers of victims or patients during transport or for on-site care. Another problem for evacuation or medical triage personnel arises when a vehicle is needed for extended periods of time on-site to care for large numbers of victims or patients, especially when those victims or patients need individual metered oxygen supplies. Under current conditions, medical attendants and medical transportation personnel are hindered by the limited amount of oxygen available for the care of large numbers of patients.

Figure 10:
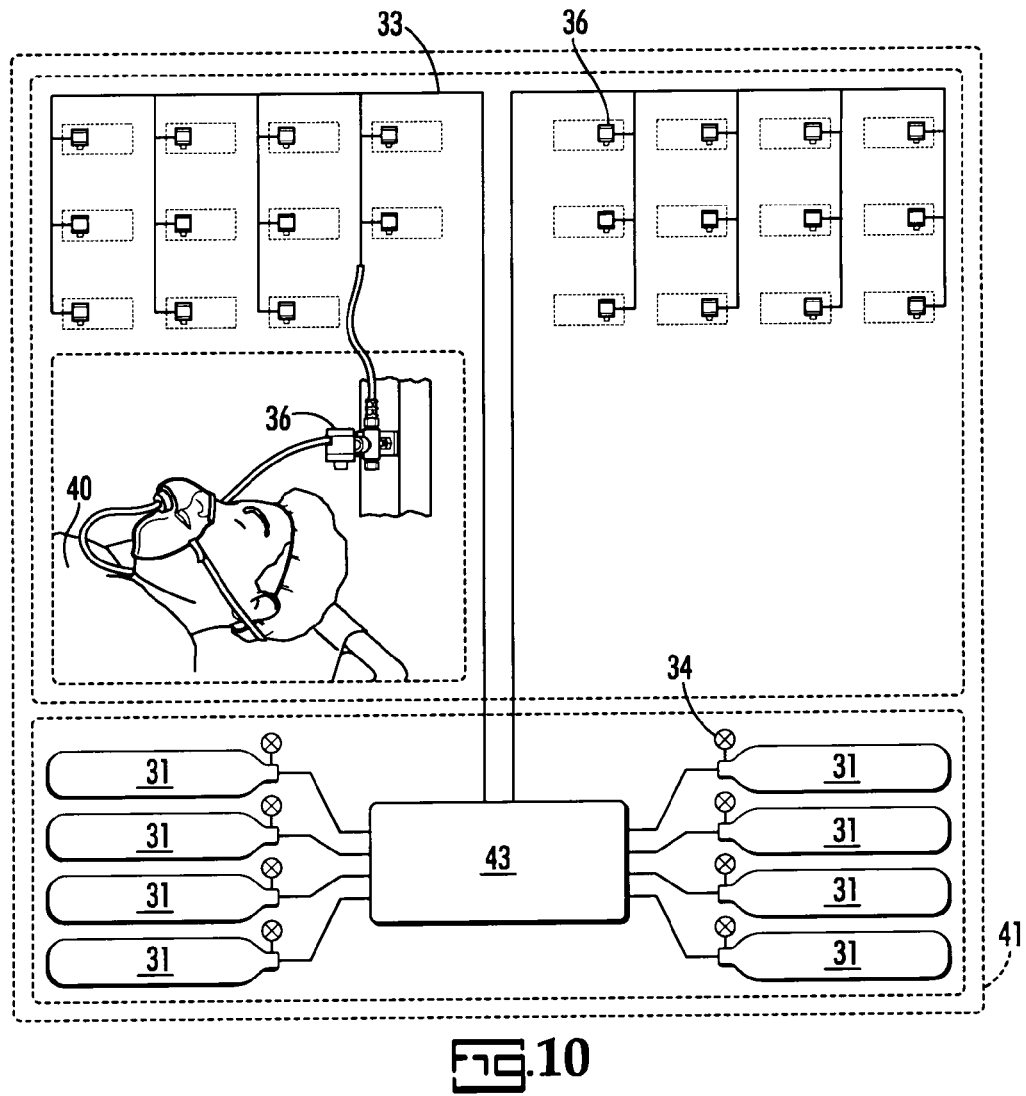
FIG. 10 shows a schematic of the oxygen system.

The oxygen system in the instant invention eliminates these disadvantages by storing and supplying a large amount of oxygen. The system supplies many hours of an individual metered oxygen supply for all of the patients needing oxygen. The invention consists, in part, of a large oxygen storage system assembly 30 (FIG. 9) and an oxygen distribution system 41 assembly (FIG. 10) to supply large numbers of victims or patients an individual metered supply of oxygen while those patients are being cared for or transported on the emergency response vehicle. The oxygen storage system, consisting of one or more oxygen tanks 31 that are secured, easily removable and replaced by medical personnel, eliminates the problem of limited oxygen supply for long periods of on-site treatment or during transportation to or from a hospital.

The oxygen distribution system distributes oxygen from the oxygen tanks 31 to the patients 40 and consists of custom designed and manufactured hoses 33, flow meters 34, and an oxygen storage and distribution control terminal 43, consisting of such components as manifolds, distribution oxygen bars, monitoring system and alarm system for high and low oxygen pressure. The system also contains an individual metered oxygen supply valve or other metering device for each patient 36 or at least some of the patients. The system as a whole is used for storing, supplying and distributing individual metered oxygen supplies to the large numbers of patents being cared for and/or transported.

The individual metered oxygen distribution system is designed to allow large numbers of patients being cared for or transported from such an incident to have individually metered oxygen supplies. The distribution system has a custom designed valve that would allow the vehicle to be parked at a hospital or other area where a main oxygen source is found and the vehicle could then be hooked up to the main oxygen supply so that the vehicle would have a sizeable supply of oxygen and, therefore, treat a large number of patients in the vehicle. The oxygen system has a custom designed emergency oxygen cut-off valve assembly that is designed to protect all medical personnel and patients in the event of an oxygen leak.

The oxygen monitoring system has been custom designed for this mass casualty vehicle. The monitoring system allows medical personnel to monitor the large supply of oxygen being stored on the vehicle and it also notifies medical personnel if there is a low or high pressure problem with the distribution system.

The oxygen storage system incorporates one or more heavy duty constructed enclosed frameworks 38 that each hold one or more large oxygen storage tanks on slide-out trays 39. Each tank is loaded into a tank cradle assembly 35 and secured tightly to the cradle by one or more (preferably two) large metal tank brackets 37. The tank tray assemblies slide in and out via a heavy duty slide mechanism 32 developed to simplify the process of changing oxygen tanks. The invention also provides a secondary large oxygen backup system 42 to provide oxygen distribution in the event the primary oxygen system has a problem or runs low on oxygen.

The invention exemplified herein provides individual metered oxygen supply to twenty four patients, but the number of oxygen distribution ports can easily be increased or decreased depending on the specifics of each vehicle. The distribution system allows caregivers the flexibility to individually meter oxygen supplies to large numbers of patients.

The preferred oxygen storage tank assembly system in accordance with this invention consists of two storage boxes, each with two or more slide out oxygen tank trays 39. Each tray generally has the capacity to hold a minimum of two large oxygen cylinders 31. Such a slide out tray has at least two bolt down securement brackets 37 to keep the oxygen tanks secure during transportation. Although this exemplified system holds a supply of eight large oxygen bottles, the number and size of the oxygen storage tank assemblies can easily be increased or decreased depending on the needs of each agency. The oxygen tank storage assembly and the compartment doors are specifically built with re-enforced framing to provide impact protection in the event of a collision.

The oxygen tank regulator assembly 43 has been specifically designed and custom built to allow two separate oxygen systems, one large primary system and one large backup system. The regulator assembly has been built with a custom designed and manufactured valve which alternatively allows the oxygen storage system to connect to an external oxygen source such as a hospital or oxygen supply vehicle, and, after having connected to the exterior oxygen source, the vehicle oxygen system will have a large amount of oxygen and can stay "On Site" for an extended amount of time providing care for patients.

Stretcher System

A problem for evacuation or medical triage personnel, when confronted with a situation where large numbers of casualties or patients must be cared for or transported, is that the transport of multiple patients is limited to the number of one- or two-patient ambulances available. In addition, patients on stretchers who are in a stacked position, which is the case when loop-type straps such as those used on military air evacuation planes, have a possibility of being dropped on another patient.

A stretcher receiving assembly, in accordance with the invention, eliminates these disadvantages by allowing a large number of patients to be treated and transported and by allowing the caregivers the flexibility to stack stretchered patients two, three or more high in a vehicle for treatment and/or transport. The stretcher receiving assembly can be in various forms, for example a sliding stretcher receiver device, a mechanism comprising ball bearings on which the stretch slides, a bunk bed or tray style of bed. An additional version or an optional component of the assembly is a tray that is capable of collecting and/or draining fluids.

Figure 11A:
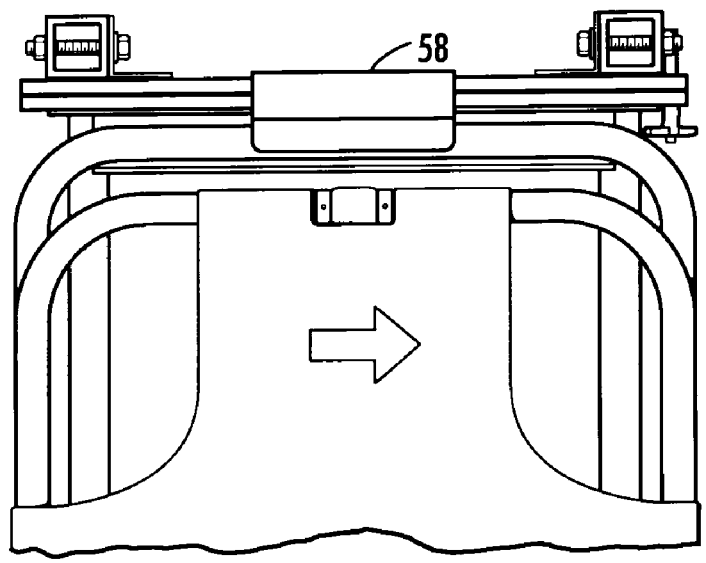
FIGS. 11 A, B and C show detail for one version of the sliding stretcher storage system.
Figure 11B:
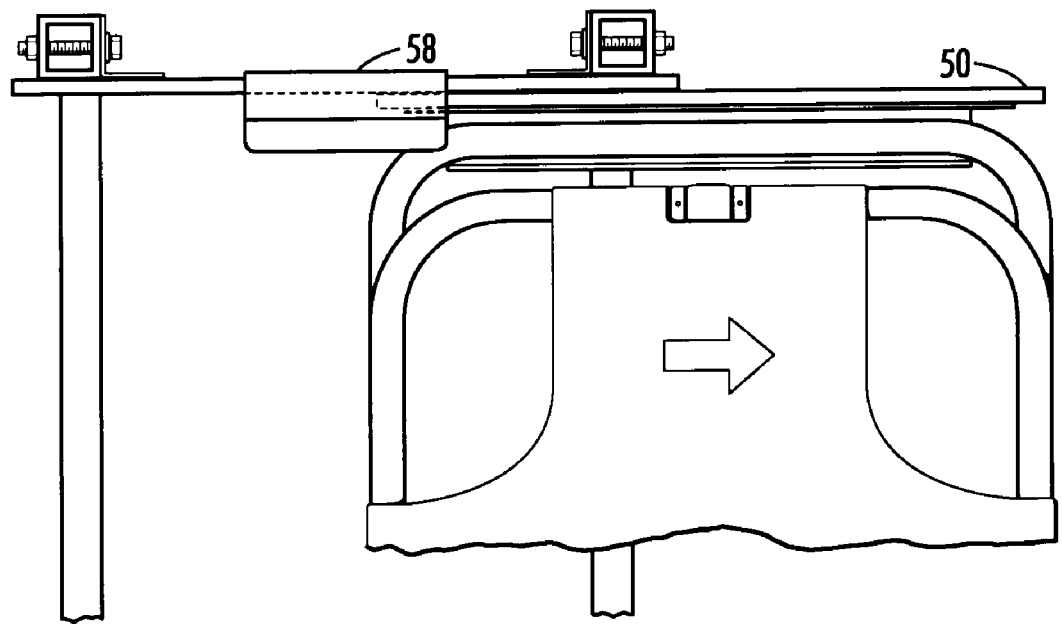
Figure 11C:
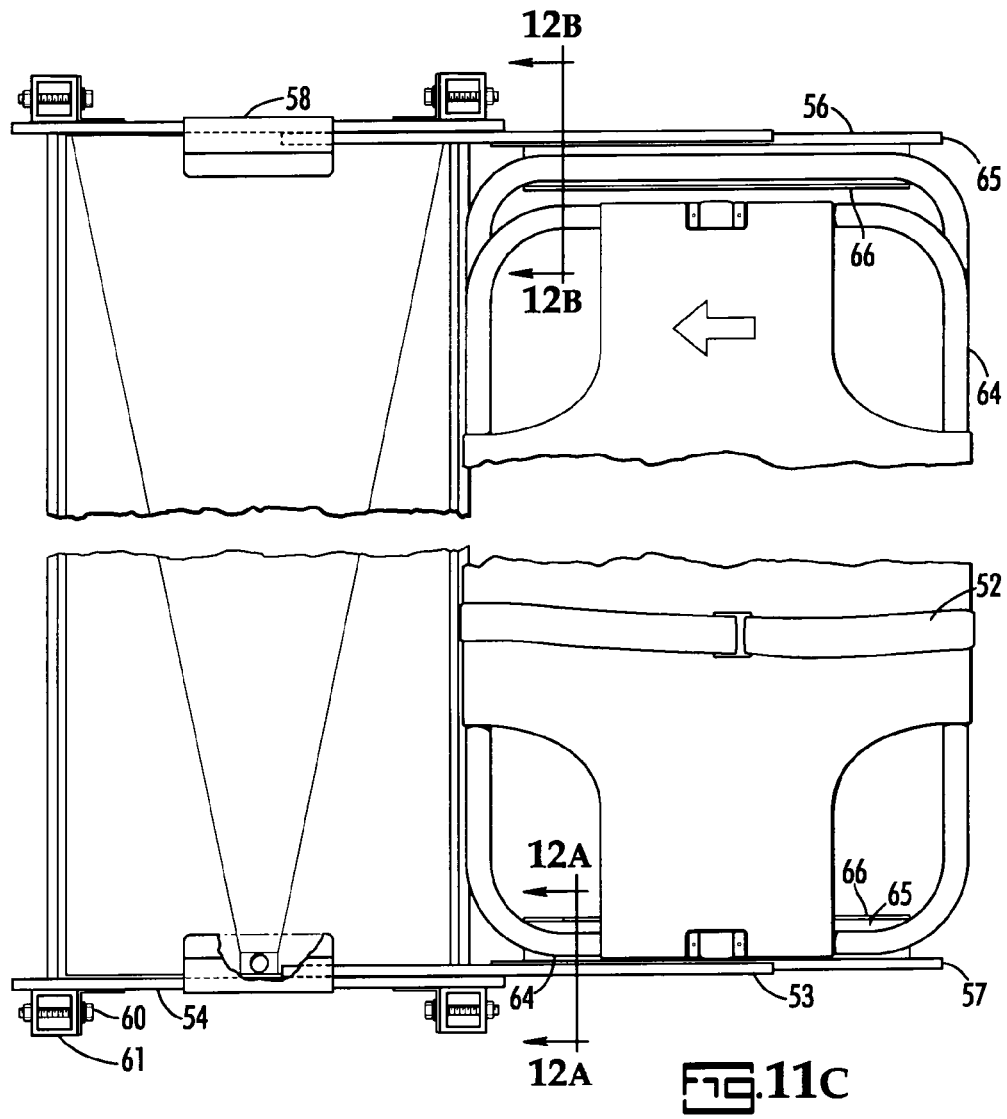

An example of the sliding stretcher receiver device is shown in FIGS. 11 A, B and C. The device specifically allows the stretchers to be loaded into the extended stretcher slide 50 and then slid under/above another patient. The stretcher slide has a vertical travel eliminator (58 in FIGS. 11A, B and C) that keeps the stretcher from becoming dislodged for any reason. The stretcher receiver also has a horizontal locking device (51 in FIGS. 14A, B and C) that eliminates movement of the stretcher after the patient has been placed in the treatment or transport position. The stretcher receiver can be built to accommodate all sizes and types of stretchers or other forms of patient transport (e.g., military type stretcher with wooden handles). The stretcher receiver can be manufactured from a wide variety of materials including but not limited to stainless steel, steel, aluminum, or any other suitable material that has the required strength. The stretcher normally has one or more patient securement straps or seat belts 52 to securely hold the patient during transport.

Figure 13A:
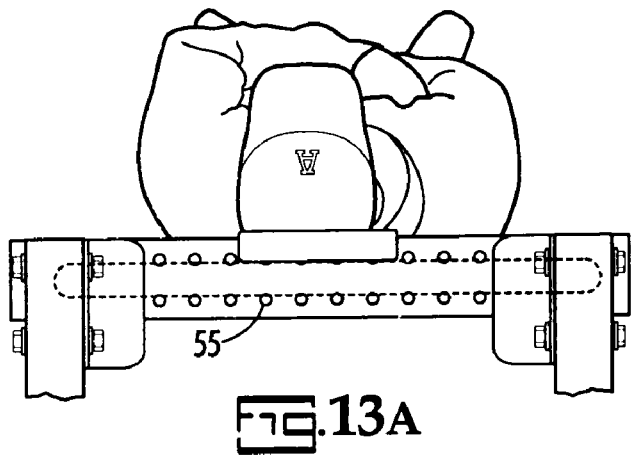
FIGS. 13 A, B and C show the operational features of the sliding stretcher assembly, an alternate stretcher storage system.
Figure 13B:
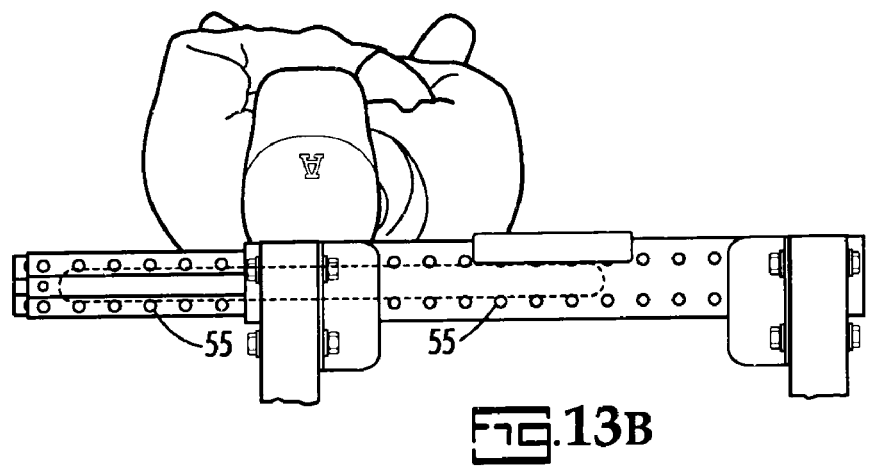
Figure 13C:
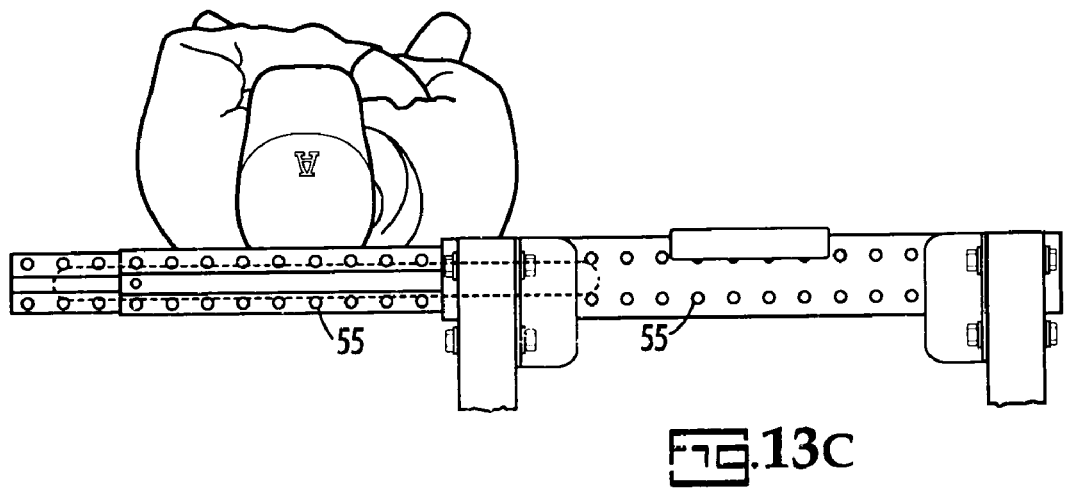

Several alternative stretcher systems are shown in FIGS. 11 and 13. The first (FIG. 11) shows a stretcher support 53 that extends from the frame 54. The second (FIG. 13) shows a system in which the stretcher moves on rollers 55. The roller system can involve movement of the body of the stretcher itself on rollers (FIG. 14A), or the top and bottom of the stretcher can be in contact with the rollers (FIGS. 14 B and C). Other roller systems can also be utilized.

The sliding stretcher receivers are typically constructed from zinc plated cold rolled 14 ga steel, but are also available in other materials such as stainless steel, aluminum and other manufactured materials. Each slide is usually rated at 550 pounds, but other weight capacities are easily built. The slides frequently have ball bearings to provide quiet and smooth operation. Other types of components available for the slides are wheels that are constructed out of rubber, nylon, steel or other manufactured materials.

Figure 12A:
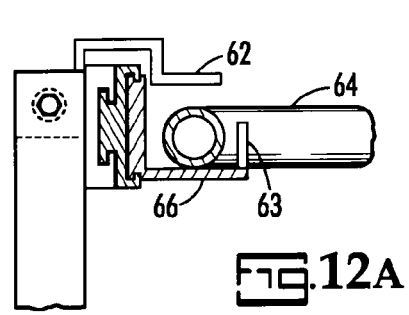
FIGS. 12 A and B show detail of the stretcher loaded into position in the connection of the stretcher shown in FIG. 11 to the sliding stretcher support.
Figure 12B:
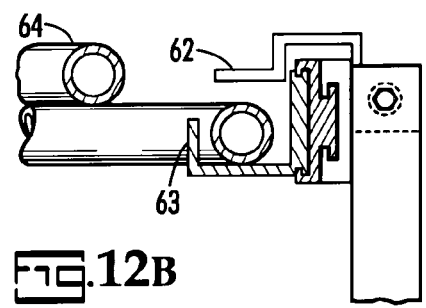

In the locked transport position, the typical stretcher receiver assembly is approximately 20" deep by 78" long. In the loading/extended position, the stretcher receiver assembly slides out to the fully open position of 41" deep. However, the slide can be built in many different sizes. The stretcher receiver tray foot 56 and head 57 are often constructed from 11 ga steel but can be built with other materials like stainless steel, aluminum or other manufactured materials. The receiver trays are welded to the stationary side of the stretcher receiver. Two corner support brace brackets can be made from ⅛" steel, 2"×4", but a wide variety of other materials may be used such as stainless steel, aluminum, or other manufactured materials. The corner support brace brackets are welded to the stationary side of the stretcher receiver. The entire stretcher assemblies are bolted 60 to the vertical support tubing 61. The vertical support tubing can be constructed from any material including wood, aluminum, steel, stainless steel or any other material. The stretcher receiver can be mounted to a stationary wall instead of a tubular support tubing. The locking pin assembly 51 is then connected to the stretcher receiver to eliminate any horizontal movement of the stretchered patient. Note that the type of construction for the stretcher utilized in FIG. 11 requires an opening 65 in the side of the support bracket 66 so that the stretcher can be placed into, and removed from, the receivers. In addition, at one end (FIG. 12A), space must be allowed for the fabric used in the stretcher to pass between the sides of the support bracket (62 and 63) and be wrapped around the tubular support 64.

One variation of the stretcher system does not incorporate the "slide out" portion of the slide described previously. The alternate mechanism (FIG. 14) allows the stretcher to slide into a channel type of receiver that has ball bearing wheels or a set of rollers/wheels along the bottom and/or top of the assembly. The ball bearings/rollers/wheels allow the stretcher to slide back into the locking position (the benefit here is that the sliding stretcher arms do not have to extend out into the aisle). Once the stretcher has been slid into place, a locking bar 51 slides down to keep the stretcher from sliding back out.

Another variation is a bunk bed type or tray style of bed, typically made of aluminum or stainless steel, that is connected to the slide out tray arms (FIG. 15). This "bed type" patient area is needed to eliminate the possibility of body fluids flowing down on patients below. The standard stretchers are set down into the tray assembly and are held in place by the same vertical and horizontal safety braces described above. The beds have, for example, a vinyl type bed mattress or mattress cover, and the tray slopes to a connection, typically in the center or on one end of the tray, for a hose connection that would be used to drain away fluids or cleaning agents used to clean the mattresses.

Figure 17:
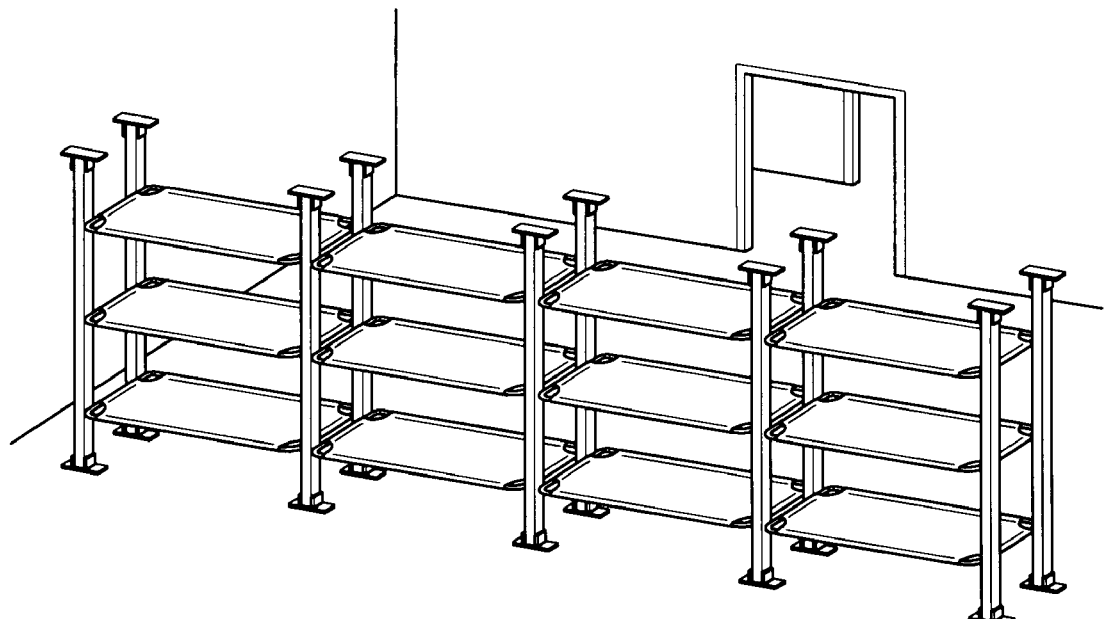
FIG. 17 shows a stretcher system that formerly was in an evacuation vehicle, but which has been reassembled in an emergency facility.

A further variation is a stacked stretcher system that can be quickly assembled, said system capable of being easily lengthened from one to three or to as many assemblies as space allows. A combination of sliding stretcher assemblies, non-sliding stretcher assemblies and bed type patient trays assemblies can be assembled within the same configuration, using either a sliding or non-sliding type assembly (similar to that in FIG. 17, except assembled in an evacuation vehicle), showing a single stacked stretcher assembly and set of four stacked stretcher assemblies connected to one another.

Another variation relates to the location in which the stacked stretcher assemblies can be assembled and used. The assembly is conducive to being rapidly assembled inside a building, such as a school gymnasium or other public area, for example an arena, a tent or other building where people would go when an evacuation is ordered (e.g., during a national disaster). The design for the stretcher assembly allows for rapid deployment from one place to another place as well as rapid dis-assembly from the vehicle and assembly in the emergency location (e.g., school gymnasium). The benefit of this system is that two or three times as many people could be housed in the same floor area vs. an unstacked stretcher system. When a disaster threatens or takes place, only a small amount of space is sometimes available for large numbers of evacuees or displaced people. The stacking stretcher/bed assemblies allow more people to stay in the same amount of space.

Other Variations

The vehicle can also be used to transport victims from a mass-casualty incident. As such, the vehicle could serve as a multiple victim transport or mortuary storage vehicle. In this variation, the refrigeration system or air conditioning system would be modified to maintain the interior of the vehicle at a maximum temperature of approximately 40 degrees F. A refrigeration unit, such as one made by Thermo King (e.g., Model MD-100) or Carrier (e.g., Model Supra 550) might be used to maintain the temperature. Such a vehicle might utilize other variations of the accessories described previously, such as a different stretcher stacking system (less space between stretchers would allow for additional victims). A wider ramp might be used, and the rear door might be folded down to become the ramp. As discussed previously, the mortuary vehicle could be built into any one of the several vehicles contemplated (e.g., a bus, trailer, truck body, etc.). This vehicle could also be used to store bodies over an extended period until autopsies or burial can be scheduled. The refrigeration unit can be powered by, for example, a diesel engine or by electricity (e.g., plugged into an electrical outlet), either of which would allow the mortuary vehicle to remain on site and store victims for an extended length of time.

Figure 16:
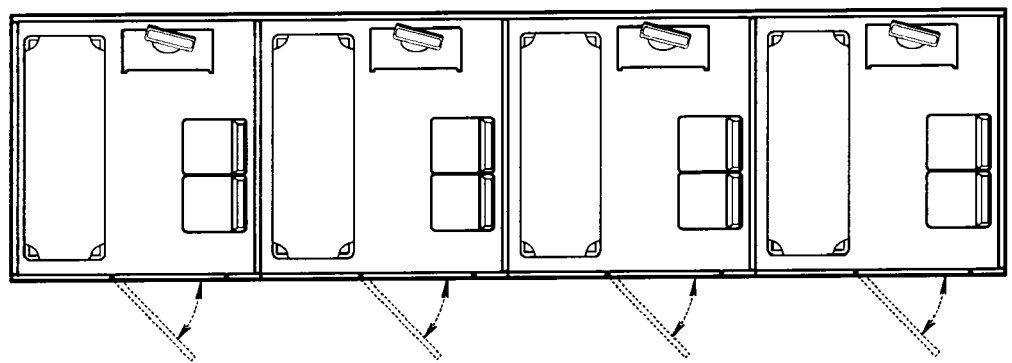
FIG. 16 shows an example of a portion of a vehicle with quarantine or isolation units.

A further variation relates to the use of a multiple emergency response vehicle equipped with individual isolation or quarantine rooms as an isolation or quarantine unit for (a) treating patients suffering from a highly communicable disease or (b) for isolating the patients until the incubation period has passed in order to determine if the individuals are infected (e.g., at a border entry point). (See FIG. 16)

The particular vehicle used to construct the examples described above was a bus, specifically a Thomas Built front engine bus with a rear loading/unloading door. All components shown were custom designed and manufactured to meet the exact needs of this particular vehicle. All components designed and manufactured are easily manufactured in different sizes and with different types of materials. The custom designed evacuation/triage interior and exterior features can also be installed in any other vehicle including, but not limited to, other buses, planes, trucks, trains, trailers, ships, subways or any other mode of transportation.

The vehicle can also optionally contain other components that might be useful in an emergency vehicle, such as the following:

emergency lighting and siren systems for emergency response vehicles, rear loading and unloading lights to assist medical personnel when loading and unloading in a dark area, exterior side lighting to illuminate a scene around the vehicle, a nurse's station, medical equipment storage drawers, refrigerator, medical monitoring equipment, electrical outlets for medical equipment operation, extended rear opening door to allow stretcher bearers more headroom when entering or exiting the vehicle, interior florescent lighting, a custom installed germ free floor covering, a master battery cutoff switch conveniently located near the driver, an emergency oxygen cutoff valve located near the driver and the front entrance door, attendant seats with restraining belts (Other attendants could stand and hold on to the front to rear grab rails mounted to the ceiling.), rooftop heating and air conditioning systems (The example described herein has three such systems.), a fuel tank (the example herein contained 100 gallons) which allows the vehicle to travel long distances or stay at the same location for long periods of time, is built to drive on any road or any firm level non-road ground situation, and can be loaded into a large airplane cargo area and transported by air to any location in the world.

The invention also relates to the transport, treatment or accommodation of multiple victims using the vehicle described above.

It will be recognized by those with ordinary skill in this area that further variations of the above described emergency response vehicle are within the scope of the disclosed invention.

We claim:

1. A stretcher system comprising:
   a. an enclosed compartment configured to permit treatment or transportation of quarantined, injured or deceased persons,
   b. a frame mounted to the compartment;
   c. a plurality of stretcher receivers positioned on the frame; and
   d. at least one stretcher receiver capable of accepting a stretcher, the stretcher receiver permitting the stretcher to be in a first position, suitable for the loading of a person, and in a second position, suitable for transporting or treating he person;
   e. the first position and the second position being in the same horizontal plane;
   wherein the at least one stretcher receiver comprises a plurality of rollers on which the stretcher can travel during horizontal loading of a stretchered person from the first position to the second position, the plurality of rollers further comprise a first set of rollers positioned on the receiver above a second set of rollers, wherein a portion of the stretcher is received between the first and second set of rollers.

2. The stretcher system of claim 1 wherein the receiver has a horizontal lock to selectively restrict horizontal movement of the stretcher.

3. The stretcher system of claim 1 wherein the receiver has vertical restraint to maintain the stretcher in vertical position while on the plurality rollers.

4. The stretcher system of claim 1 further comprising a catch tray positioned below a first stretcher receiver so that fluids or other foreign objects are caught before reaching a second stretcher receiver, positioned at least partially vertically below the first stretcher receiver.

5. The stretcher system of claim 1, wherein at least one stretcher receiver comprises
   a. at least one slide operable to move and at least partially support the stretcher as it moves from the first position to the second position; and
   b. the at least one slide capable of receiving a stretcher when in the first position, and retaining the stretcher thereon as the slide is moved to the second position.

6. The stretcher system of claim 5 wherein the at least one slide has a channel that is configured to receive at least a portion of the stretcher.

7. The stretcher system of claim 5 wherein the at least one slide has a horizontal lock to selectively restrict horizontal movement of the stretcher.

8. The stretcher system of claim 5 wherein the slide has a vertical restraint to maintain the stretcher in vertical position while on the slide.

9. The stretcher system of claim 1 wherein the frame is mounted to and extends from a floor of the compartment.

10. The stretcher system of claim 1 wherein the frame is removably mounted to the compartment, allowing for removal of the frame and use outside of the compartment.

11. An emergency response transportable treatment station for the treatment or transportation of quarantined, injured or deceased persons, comprising:
   a. an interior compartment;
   b. a support frame positioned in the interior compartment, the support frame containing a plurality of stacked stretcher assemblies; and
   c. at least one stretcher assembly comprising a stretcher receiver configured to permit horizontal loading of the stretcher containing a person;
   wherein the receiver comprises a plurality of rollers on which the stretcher can travel during horizontal loading of a stretchered person, the plurality of rollers further comprise a first set of rollers positioned on the receiver above a second set of rollers, wherein a portion of the stretcher is received between the first and second set of rollers.

12. The treatment station of claim 11 further comprising a walk-up loading ramp.

13. The treatment station of claim 11 further comprising an external compartment having at least one oxygen source, the oxygen source capable of delivering oxygen to at least one of the stretcher assemblies.

14. The treatment station of claim 11 wherein the frame is removably mounted to the compartment, for use outside of the compartment.

15. The treatment station of claim 11 wherein the receiver has a horizontal lock to selectively restrict horizontal movement of the stretcher.

16. The treatment station of claim 11 wherein the receiver has a vertical restraint to maintain the stretcher in vertical position while on the plurality of rollers.

17. The treatment station of claim 11, wherein at least one stretcher receiver comprises:
   a. at least one slide operable to move horizontally from a first position to a second position to facilitate loading and unloading of persons being treated or transported; and
   b. the at least one slide capable of receiving a stretcher when in the first position, and retaining the stretcher thereon as the slide is moved to the second position.

18. The treatment station of claim 11 wherein the at least one slide has a channel that is configured to receive the stretcher.

19. The treatment station of claim 11 wherein the at least one slide has a horizontal lock to selectively restrict horizontal movement of the stretcher.

20. The treatment station of claim 11 wherein the slide has a vertical restraint to maintain the stricter in vertical position while on the slide.

21. A method of treating or transporting quarantined, injured or deceased persons comprising:
   a. providing a person on a stretcher;
   b. loading the stretchered person into a transportable emergency response station containing a plurality of vertically stacked stretcher assemblies;
   c. extending horizontally a portion of the stretcher assembly to permit loading the stretchered person into at least one of the stretcher assemblies; and
   d. the stretcher assembly portion being at least partially supported by rollers located on the stretcher assembly with a plurality of rollers positioned above and a plurality of rollers positioned below the extendable stretcher assembly portion.

22. The method of claim 21 further comprising the step of securing the stretcher from horizontal or vertical movement.

23. The method of claim 21 further comprising the step of returning the extended portion of the stretcher assembly to the stretcher assembly after loading.

24. The method of claim 21 further comprising the step of providing a catch tray below the extended portion of the stretcher assembly.

* * * * *

UNITED STATES PATENT AND TRADEMARK OFFICE
CERTIFICATE OF CORRECTION

PATENT NO. : 8,104,814 B2
APPLICATION NO. : 12/514525
DATED : January 31, 2012
INVENTOR(S) : Edward Lewis Sartin and Edward Austin Sartin It is certified that error appears in the above-identified patent and that said Letters Patent is hereby corrected as shown below:

In the Claims:

At Column 12, Claim 3, Line 9, replace "plurality rollers." with "plurality of rollers."

At Column 13, Claim 20, Line 20, replace "stricter" with "stretcher".

Signed and Sealed this
Twentieth Day of March, 2012

David J. Kappos
*Director of the United States Patent and Trademark Office*